(12) United States Patent
Kuo (10) Patent No.: US 10,865,925 B2
(45) Date of Patent: Dec. 15, 2020

(54) QUICK-DISASSEMBLY NIPPLE CONNECTOR STRUCTURE

(71) Applicant: Shuoxing Metal Products (Kunshan) CO., LTD., Jiangsu (CN)

(72) Inventor: Heng-Chia Kuo, Jiangsu (CN)

(73) Assignee: Shuoxing Metal Products (Kunshan) Co., Ltd., Kunshan (CN)

( * ) Notice: Subject to any disclaimer, the term of this patent is extended or adjusted under 35 U.S.C. 154(b) by 253 days.

(21) Appl. No.: 16/115,425

(22) Filed: Aug. 28, 2018

(65) Prior Publication Data

US 2020/0041056 A1 Feb. 6, 2020

(30) Foreign Application Priority Data

Aug. 1, 2018 (CN) .................... 2018 2 1263669 U (51) Int. Cl.
*F16L 37/138* (2006.01)
*F16N 21/02* (2006.01)
*F16L 37/10* (2006.01)
*F16L 19/07* (2006.01)
*F16N 3/12* (2006.01)

(52) U.S. Cl.
CPC ............ *F16L 37/138* (2013.01); *F16L 19/07* (2013.01); *F16L 37/101* (2013.01); *F16N 21/02* (2013.01); *F16N 3/12* (2013.01)

(58) Field of Classification Search
CPC ....... F16L 19/07; F16L 37/138; F16L 37/122; F16L 37/16; F16L 37/20; F16N 21/00
USPC ............................. 285/34, 38, 322, 323, 324
See application file for complete search history.

(56) References Cited

U.S. PATENT DOCUMENTS

| | | | |
|---|---|---|---|
| 5,060,982 A † | 10/1991 | Matsushita | |
| 2012/0267890 A1* | 10/2012 | Gurney | F16L 37/138 285/308 |
| 2018/0299065 A1* | 10/2018 | Hung | F16N 3/12 |
| 2019/0120413 A1* | 4/2019 | Verma | F16L 37/121 |
| 2019/0333420 A1* | 10/2019 | Danielson | F16L 37/20 |
| 2020/0032957 A1* | 1/2020 | Salomon | F16N 21/04 |

FOREIGN PATENT DOCUMENTS

AU 2017101056 A4 † 9/2017
TW M278816 U † 10/2005

\* cited by examiner
† cited by third party

*Primary Examiner* — Aaron M Dunwoody
(74) *Attorney, Agent, or Firm* — Wang Law Firm, Inc.

(57) ABSTRACT

Disclosed is a quick-disassembly nipple connector structure, which is mainly composed of a pipe, a pivoting assembly, a screwing member, a plurality of gripping jaws, a sleeve and a handle. The handle can be pulled by users to enable the quick-disassembly nipple connector structure to be rapidly connected to or separated from a grease nipple. When the handle is pulled downwards, the sleeve is located at a lock position to lock the grease nipple; and when the handle is pulled upwards, the sleeve is located at a release position to release the grease nipple. Thus, the quick-disassembly nipple connector structure has the advantages of being capable of improving work efficiency, high in positioning speed, high in accuracy and good in fixing property and has a good overall constituent strength, so that the motion stability is improved, and the operation smoothness and service life are ensured.

4 Claims, 8 Drawing Sheets

QUICK-DISASSEMBLY NIPPLE CONNECTOR STRUCTURE

BACKGROUND

1. Technical Field

The present invention relates to a nipple connector structure, in particular to a quick-disassembly nipple connector structure capable of being pressed by users.

2. Description of Related Art

At present, a nipple connector structure usually serves as a connecting device between a grease gun and a grease nipple in the industrial field to inject grease between machine parts to achieve a lubrication effect, so that the machined parts are protected, and the life of the machine parts is prolonged.

Figure 1:
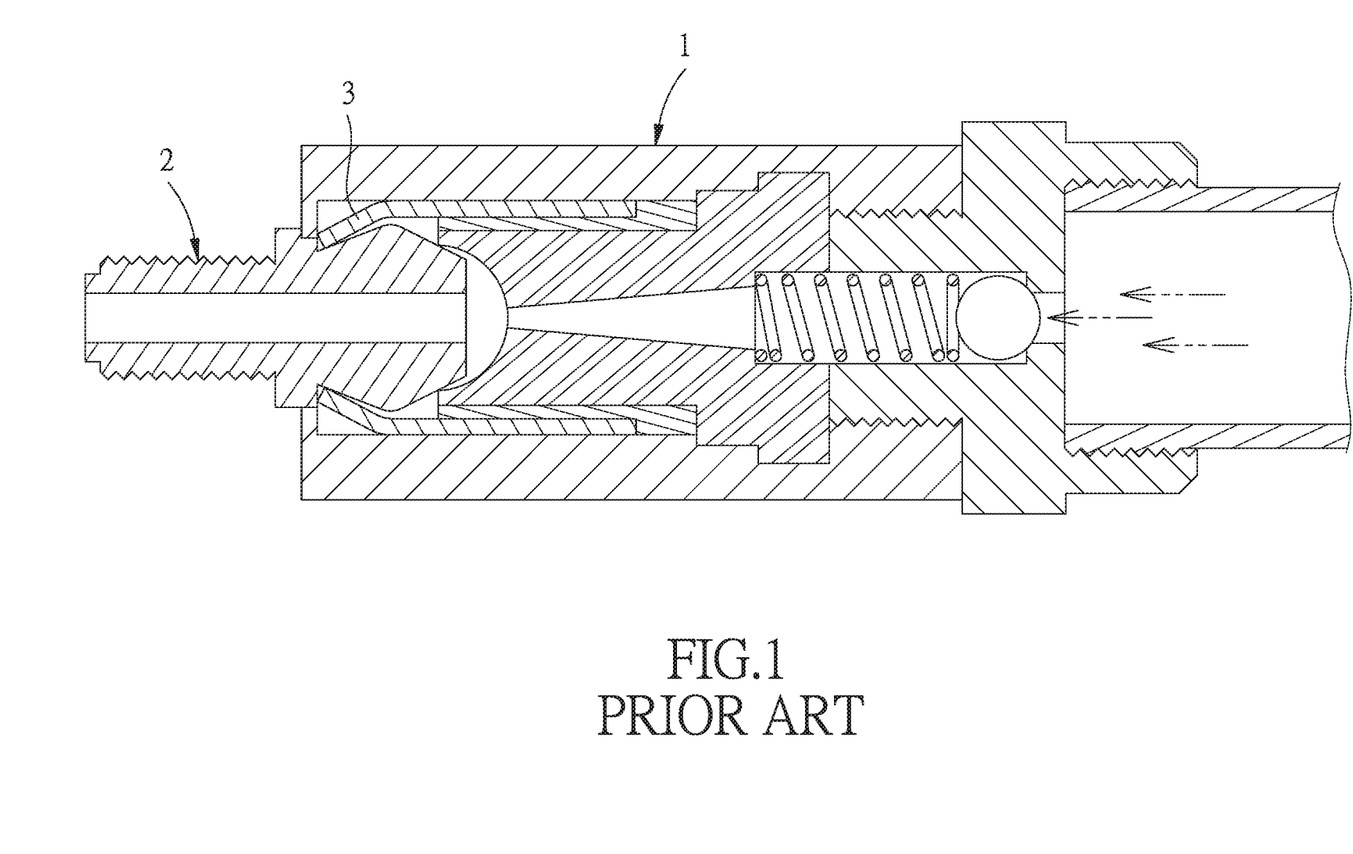
FIG. 1 is a sectional view of an existing nipple connector structure.
Figure 2:
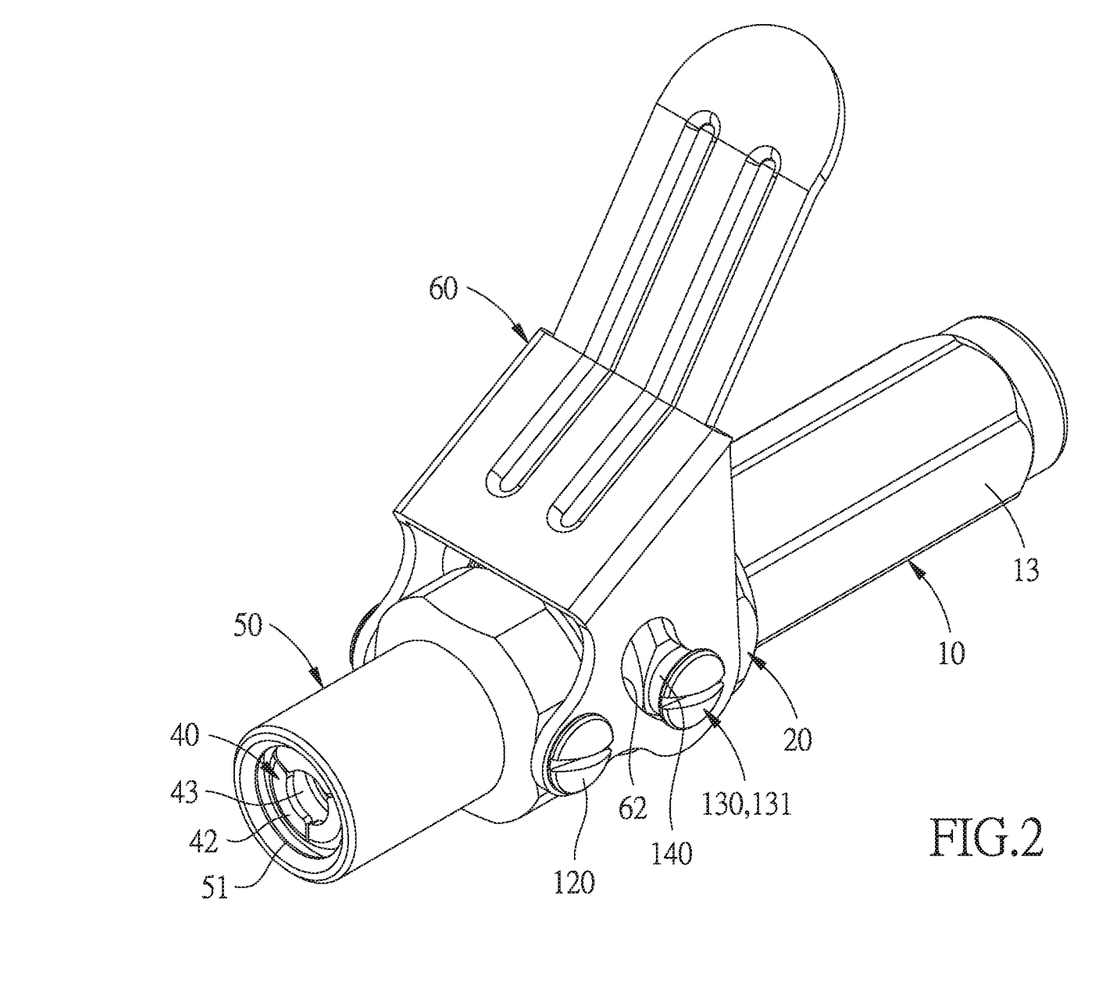
FIG. 2 is a perspective view of one embodiment of the present invention.
Figure 3:
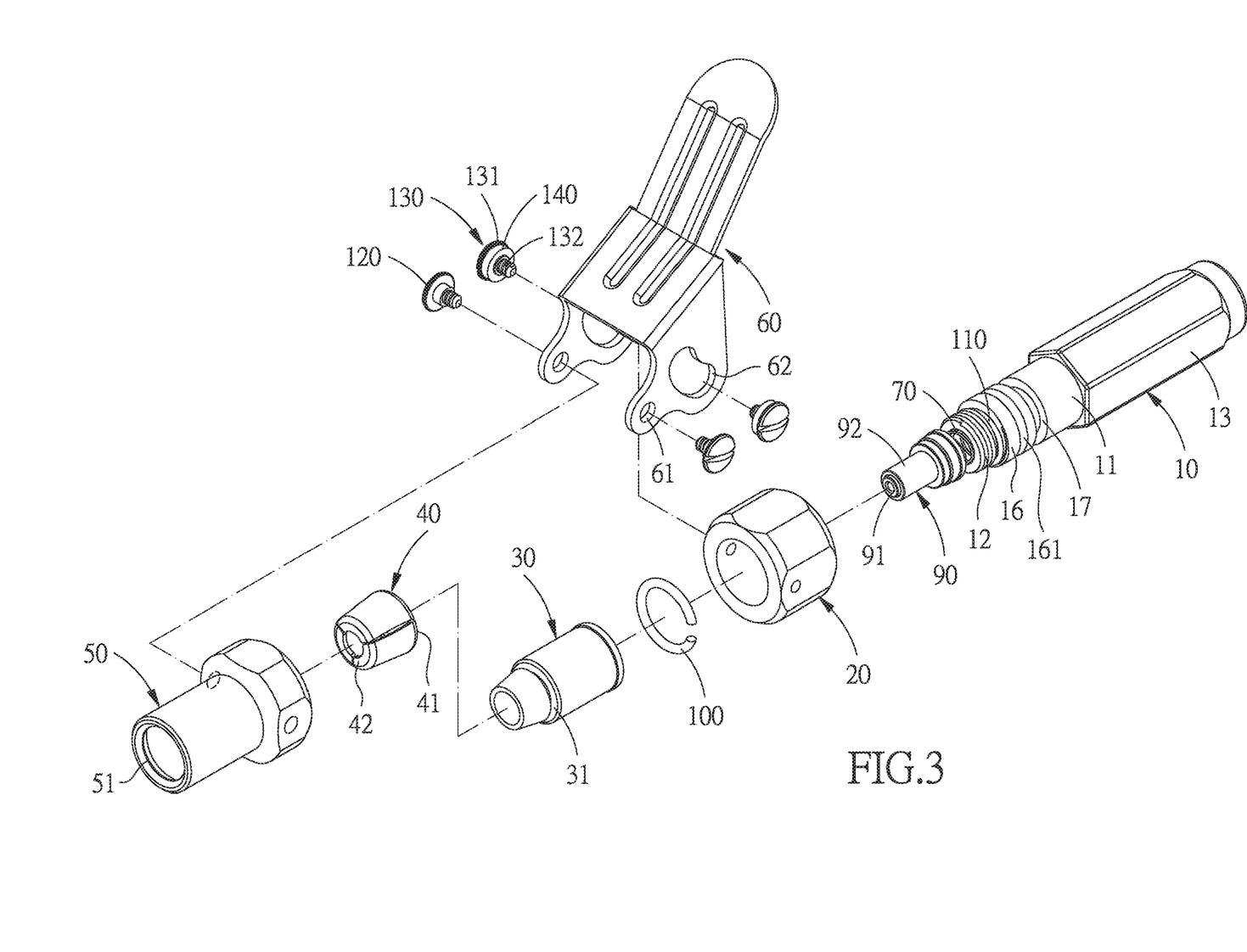
FIG. 3 is a disassembled view of one embodiment of the present invention.

Please refer to FIG. 1 which shows an existing nipple connector structure. The existing nipple connector structure 1 is pushed to be combined with a grease nipple 2, but when the nipple connector structure 1 needs to be separated from the grease nipple 2, the user have to shake the nipple connector structure 1 upwards and downwards or leftwards and rightwards by holding the outer surface of the nipple connector structure 1 so as to separate the nipple connector structure 1 from the grease nipple 2. However, in this separation process, a plurality of gripping jaws 3 of the nipple connector structure 1 are pulled and are prone to breakage if the user forcibly pull the nipple connector structure 1 down from the grease nipple 2, thus, damaging the plurality of gripping jaws 3, affecting the service life of the nipple connector structure 1, and resulting in the defects of poor pressure bearing capacity and unsatisfactory sealing effect during use under a high pressure. In addition, due to the excessive clamping force of the plurality of gripping jaws 3, the user cannot easily separate the nipple connector structure 1 from the grease nipple 2, resulting in inconvenience in operation and use and high time and labor consumption, and reducing service efficiency.

In addition, when the grease gun is used for injecting grease, the nipple connector structure 1 needs to be accurately aligned to the grease nipple to complete grease injection. If the nipple connector structure 1 and the grease nipple are not accurately aligned, the nipple connector structure 1 is likely to be separated from the grease nipple, and even grease leakage can be caused, consequentially, affecting the work efficiency. Meanwhile, by the fact that machines adopting the grease nipple are generally located in a narrow or severe environment, the applicable operation space for the nipple connector structure 1 is very small, an extra operation space is needed for the user, and consequentially, the operation speed of the user is extremely low, the nipple connector structure 1 and the grease nozzle 2 cannot be accurately aligned, and the operation space is limited.

In view of this, the research and improvement objective of the present invention is to overcome the conventional problems and defects mentioned above.

BRIEF SUMMARY OF THE INVENTION

The objective of the present invention is to provide a quick-disassembly nipple connector structure, which is typically provided with a handle capable of being pulled upwards or downwards to achieve accurate alignment between the quick-disassembly nipple connector structure and a grease nipple, thus, saving time and labor.

The quick-disassembly nipple connector structure of the present invention comprises:

a pipe, wherein the pipe comprises a pivoting part and a screwing part connected to the pivoting part;

a pivoting assembly, wherein the pivoting assembly is disposed around the pivoting part in a pivoting manner;

a screwing member, wherein the screwing member is in screw joint with the screwing part, and a fixing ring groove is concavely formed in the outer surface of the screwing member;

a plurality of gripping jaws, wherein each gripping jaw is provided with a first sleeving end to be disposed around the fixing ring groove and a second sleeving end opposite to the first sleeving end;

a sleeve, wherein the sleeve is disposed around the screwing member and the plurality of gripping jaws in a pivoting manner, is provided with a convex abutting part having a convex inner circular wall and abutting against the plurality of clamping jaws, and is capable of moving between a lock position and a release position; when located at the lock position, the sleeve is close to the pivoting assembly, and the convex abutting part abuts against the plurality of gripping jaws; and when located at the release position, the sleeve is away from the pivoting assembly, and the convex abutting part does not abut against the plurality of gripping jaws; and a handle, wherein the handle is disposed on the pivoting assembly and the sleeve and can be driven by the pivoting assembly and the sleeve to pivot, so that the sleeve is driven to move to the lock position or the release position.

Preferably, a connecting part is disposed between the pivoting part and the screwing part and is concavely provided with a limiting ring groove. The quick-disassembly nipple connector structure further comprises a C-shaped fastener, which is disposed around the limiting ring groove and abuts against the pivoting assembly.

Preferably, the quick-disassembly nipple connector structure further comprises an O-shaped ring, which is disposed around a portion between the connecting part and the screwing part and is covered by the screwing member.

Preferably, the quick-disassembly nipple connector structure further comprises two first locking components, which penetrate through the handle and are locked on the sleeve.

Preferably, a concave groove is formed between the pivoting part and the screwing part. The quick-disassembly nipple connector structure further comprises two second locking components and two spacers. The two locking components respectively penetrate through the two spacers and the handle and are locked on the sleeve. Each second locking component is provided with a head and a body connected to the head. The head of each second locking component abuts against the corresponding spacer. The body of each second locking component has an end connected to the corresponding head and an end corresponding to the concave groove.

From the above description, the quick-disassembly nipple connector structure is mainly composed of the pipe, the pivoting assembly, the screwing member, the plurality of gripping jaws, the sleeve and the handle. The handle can be pulled by the users to enable the quick-disassembly nipple connector structure to be rapidly connected to or separated from the grease nipple. When the handle is pulled downwards, the sleeve is located at the lock position to lock the grease nipple; and when the handle is pulled upwards, the sleeve is located at the release position to release the grease nipple. Thus, the quick-disassembly nipple connector structure has the advantages of being capable of improving work efficiency, high in positioning speed, high in accuracy and good in fixing property and has a good overall constituent strength, so that the motion stability of the nipple connector structure is improved, and the operation smoothness and service life of the nipple connector structure are ensured.

DETAILED DESCRIPTION OF THE INVENTION

The technical scheme of the present invention is clearly and completely described as follows in combination with the drawings. Apparently, the embodiments in the following description are only parts of embodiments of the present invention instead of all embodiments of the present invention. All other embodiments obtained based on these embodiments by those ordinarily skilled in this field without creative work should fall within the protection scope of the present invention.

As shown in FIGS. 2-8, the quick-disassembly nipple connector structure is mainly composed of a pipe 10, a pivoting assembly 20, a screwing member 30, a plurality of gripping jaws 40, a sleeve 50 and a handle 60, wherein:

The pipe 10 comprises a pivoting part 11 and a screwing part 12 connected to the pivoting part 11. In this embodiment, the pipe 10 is provided with a handheld part 13 connected to the pivoting part 11, a central passage 14 penetrating through the pivoting part 11, the screwing part 12 and the handheld part 13, and a conical opening 15 formed in the central passage 14. The handheld part 13 is of a hexagonal structure. A spring 70, a ball 80 and an abutting assembly 90 are disposed in the pipe 10. The abutting assembly 90 is provided with a first abutting piece 91 and a second abutting piece 92 disposed around the first abutting piece 91. One end of the spring 70 abuts against the ball 80 to block the conical opening 15, and the other end of the spring 70 abuts against the first abutting piece 91.

The pivoting assembly 20 is disposed around the pivoting part 11 in a pivoting manner and abuts against the handheld part 13. In this embodiment, the pivoting assembly 20 can pivot in a radial direction with the pipe 10 as the center. Through the configuration of the pivoting assembly 20, different holding angles can be provided for users to facilitate operation. Wherein, a connecting part 16 is disposed between the pivoting part 11 and the screwing part 12 and is concavely provided with a limiting ring groove 161. The quick-disassembly nipple connector structure further comprises a C-shaped fastener 100, which is disposed around the limiting ring groove 161 and abuts against the pivoting assembly 20. With the assistance of the C-shaped fastener 100, the pivoting assembly 20 is positioned.

The screwing member 30 is conical and is in screw joint with the screwing part 12, and a fixing ring groove 31 is concavely formed in the outer surface of the screwing member 30. Furthermore, the quick-disassembly nipple connector structure further comprises an O-shaped ring 110, which is disposed around a portion between the connecting part 16 and the screwing part 12 and is covered by the screwing member 30.

Each of the plurality of gripping jaws 40 is provided with a first sleeving end 41 to be disposed around the fixing ring groove 31 and a second sleeving end 42 opposite to the first sleeving end 41 and capable of clamping a grease nipple A. In this embodiment, the number of the gripping jaws 40 is three by way of example, but is not limited to three. Through the design that the second sleeving ends 42 abut against and clamp the grease nipple A, the connection stability is improved, and the phenomenon that the quick-disassembly nipple connector structure is separated from the grease nipple A in a high-pressure grease injection state is avoided.

The sleeve 50 is disposed around the screwing member 30 and the plurality of gripping jaws 40 in a pivoting manner, is provided with a convex abutting part 51 having a concave inner circular wall and abutting against the plurality of gripping jaws 40, and can move between a lock position P1 and a release position P2. When located at the lock position P1, the sleeve 50 is close to the pivoting assembly 20, and the convex abutting part 51 abuts against the plurality of gripping jaws 40. When located at the release position P2, the sleeve 50 is away from the pivoting assembly 20, the convex abutting part 51 does not abut against the plurality of gripping jaws 40, and the grease nipple A is sleeved with the second sleeving ends 42 of the plurality of gripping jaws 40. Furthermore, the sleeve 50 is disposed around the front end of the pipe 10 and covers the plurality of gripping jaws 40. The convex abutting part 51 abuts against the plurality of gripping jaws 40 so as to actuate the gripping jaws 40 to open or close. The sleeve 50 and the pivoting assembly 20 pivot in the radial direction with the pipe 10 as the center.

The handle 60 is disposed on the pivoting assembly 20 and the sleeve 50 to drive the sleeve 50 to move to the lock position P1 or the release position P2, and the handle 60 can be driven by the pivoting assembly 20 and the sleeve 50 to pivot synchronously along with the pivoting assembly 20 and the sleeve 50. Two first through holes 61 and two second through holes 62 penetrate through the handle 60. Furthermore, the quick-disassembly nipple connector structure further comprises two first locking components 120, which respectively penetrate through the first through holes 61 of the handle 60 and are locked on the sleeve 50. Furthermore, a concave groove 17 is formed between the pivoting part 11 and the screwing part 12. The quick-disassembly nipple connector structure further comprises two second locking components 130 and two spacers 140. The two second locking components 130 respectively penetrate through the two spacers 140 and the two second through holes 62 of the handle and are locked on the sleeve 50. Each second locking component 130 is provided with a head 131 and a body 132 connected to the head 131. The head 131 of each second locking component 130 abuts against the corresponding spacer 140. The body 132 of each second locking component 130 has an end connected to the corresponding head 131 and an end corresponding to the concave groove 17. The users can operate the sleeve 50 to move to the lock position P1 or the release position P2 by pulling the handle 60 upwards or downwards, and then the quick-disassembly nipper connector structure tightly abuts against or is separated from the grease nipple A. Thus, time and labor are saved, accurate alignment is achieved, and work efficiency is improved.

The quick-disassembly nipple connector structure of the present invention is formed by the above components. The usage condition of the quick-disassembly nipple connector structure is further described as follows.

Figure 4:
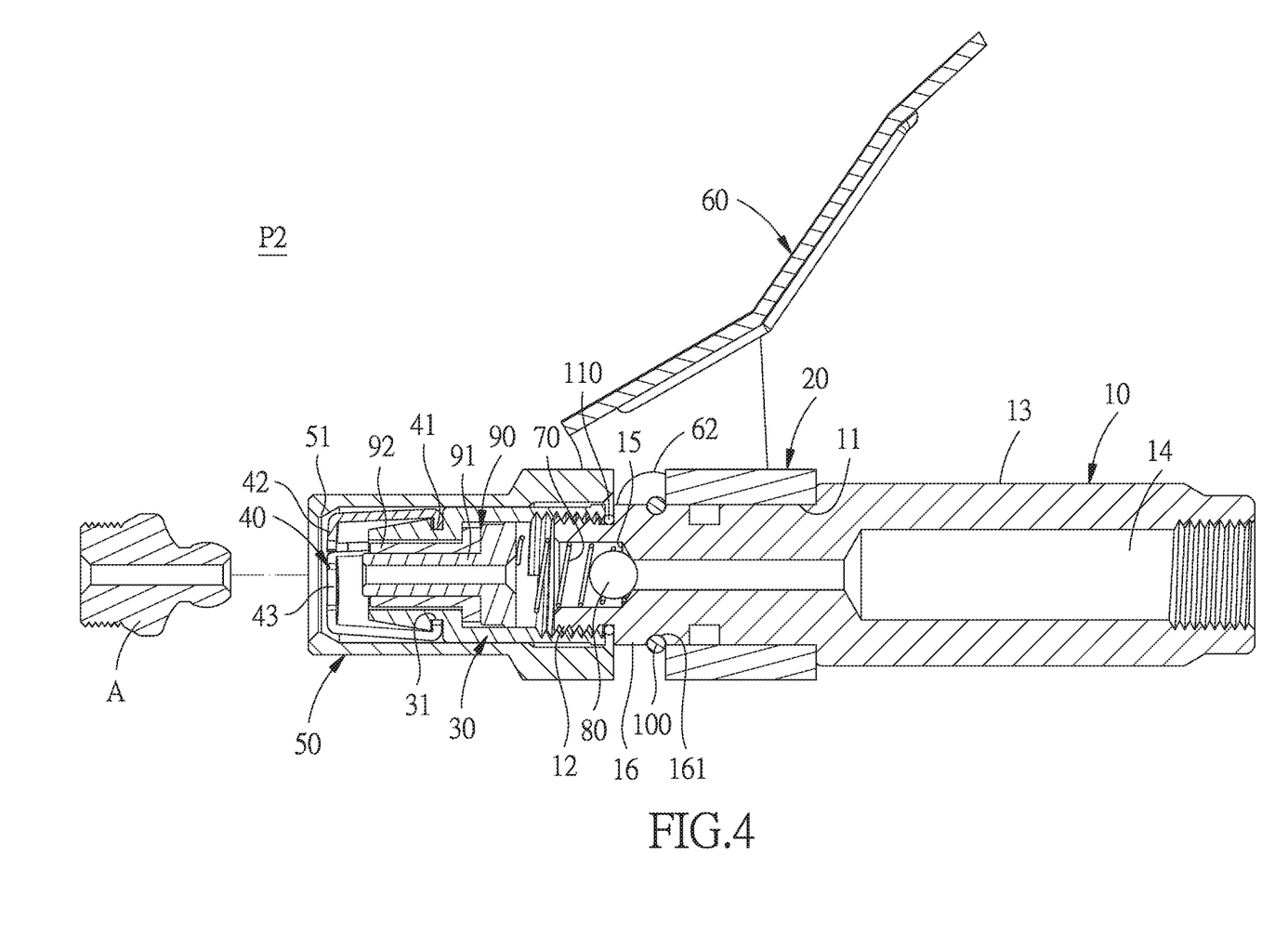
FIG. 4 is a first usage status view of one embodiment of the present invention.
Figure 5:
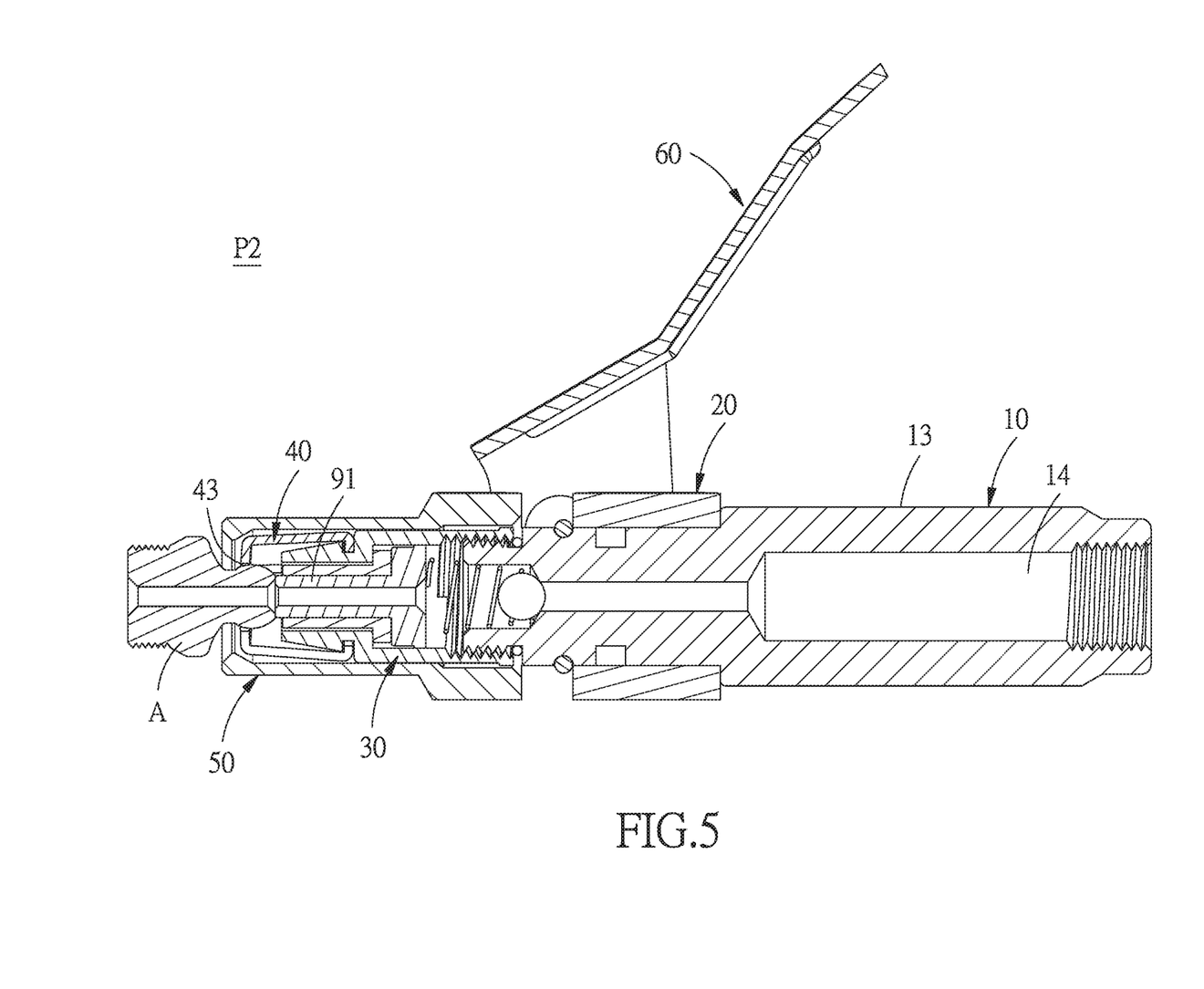
FIG. 5 is a second usage status view of one embodiment of the present invention.
Figure 6:
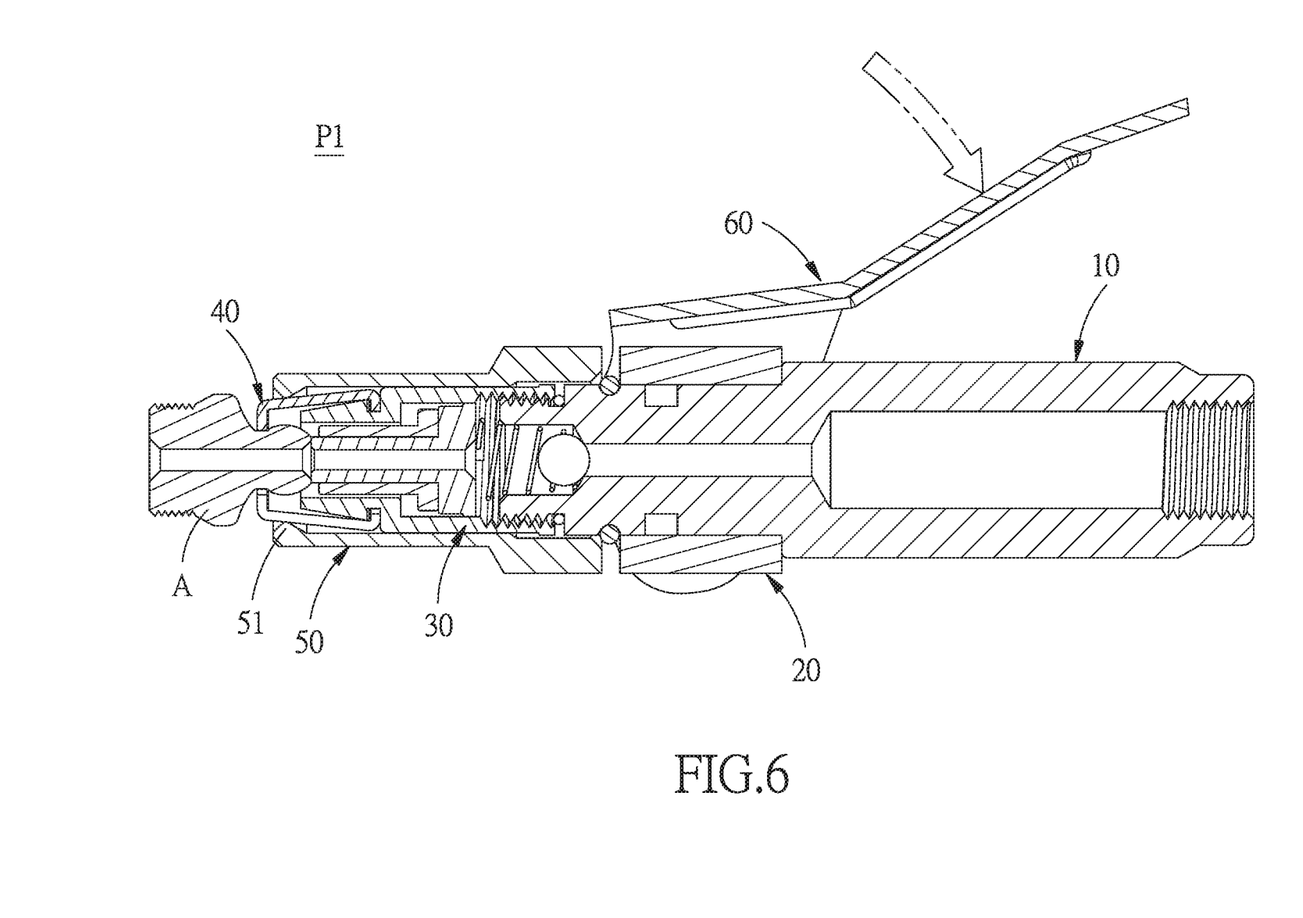
FIG. 6 is a third usage status view of one embodiment of the present invention.
Figure 7:
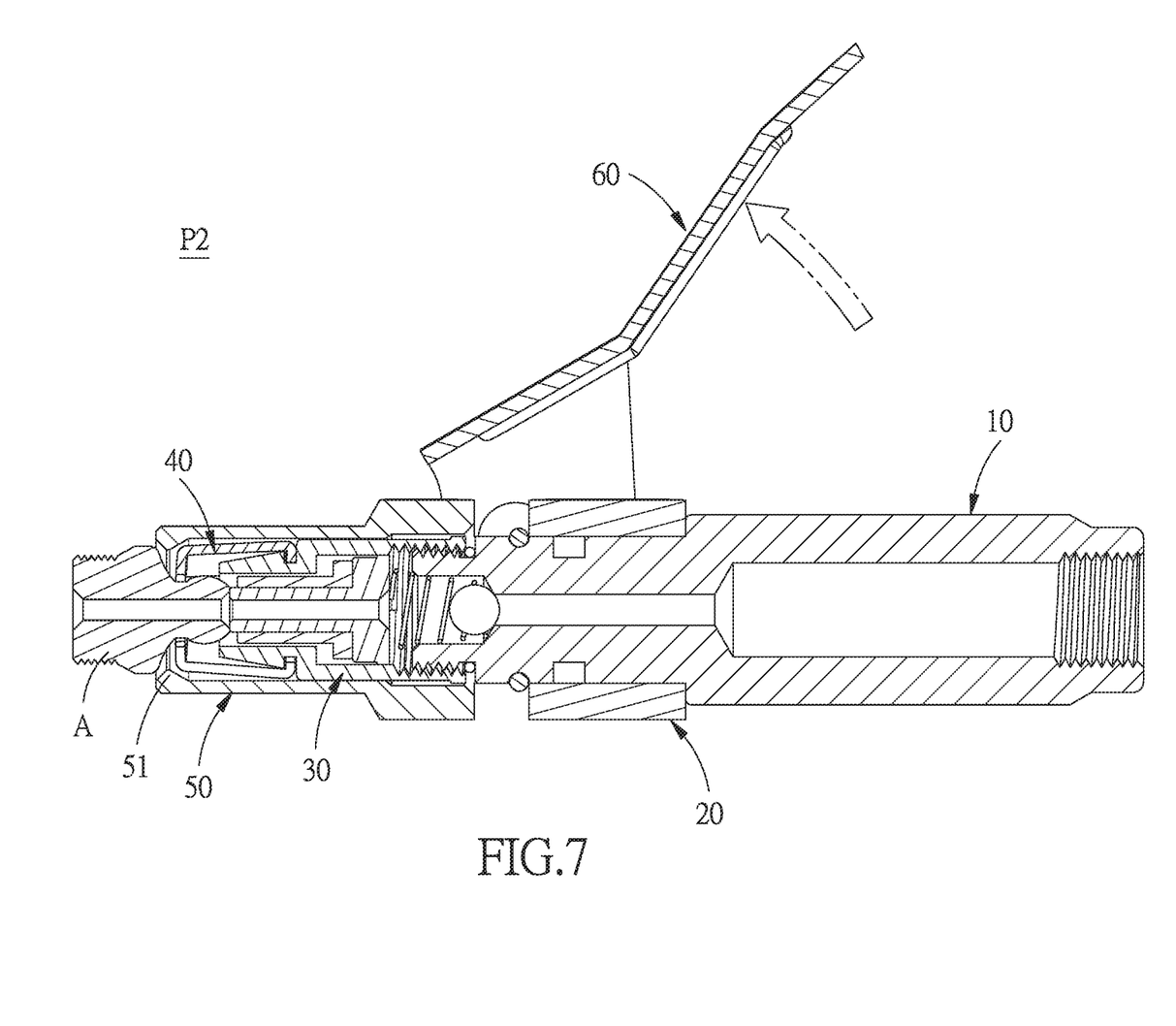
FIG. 7 is a fourth usage status view of one embodiment of the present invention.

Referring to FIG. 4 which shows the grease nipple A and the quick-disassembly nipple connector structure, the sleeve 50 is located at the release position P2 and is away from the pivoting assembly 20, the convex abutting part 51 does not abut against the plurality of gripping jaws 40, the plurality of gripping jaws 40 are opened, and the users align a penetration hole 43 defined by the second sleeving ends 42 of the plurality of the gripping jaws 40 to the grease nipple A; as shown in FIG. 5, the grease nipple A penetrates into the penetration hole 43, at this moment, the first abutting piece 91 abuts against the grease nipple A, the sleeve 50 is still located at the release position P2, and the plurality of gripping jaws 40 do not abut against or clamp the surface of the grease nipple A; as shown in FIG. 6, the users pull the handle 60 downwards to make the sleeve 50 move to the lock position P1 and close to the pivoting assembly 20, the convex abutting part 51 abuts against the plurality of gripping jaws 40, the plurality of gripping jaws 40 are closed and stably and firmly clamp the grease nipple A, and thus, the quick-disassembly nipple connector structure is prevented from being separated from the grease nipple A; as shown in FIG. 7, the users pull the handle 60 upwards to make the sleeve 50 move to the release position P2 and keep away from the pivoting assembly 20, the convex abutting part 51 does not abut against the plurality of gripping jaws 40, and the plurality of gripping jaws 40 are opened, so that the grease nipple A is separated from the quick-disassembly nipple connector structure without damage to the plurality of gripping jaws 40. From the above description, the quick-disassembly nipple connector structure can be quickly switched to the lock position P1 or the release position P2, thus, saving time and labor, facilitating operation, and avoiding damage caused by excessive force application.

Figure 8:
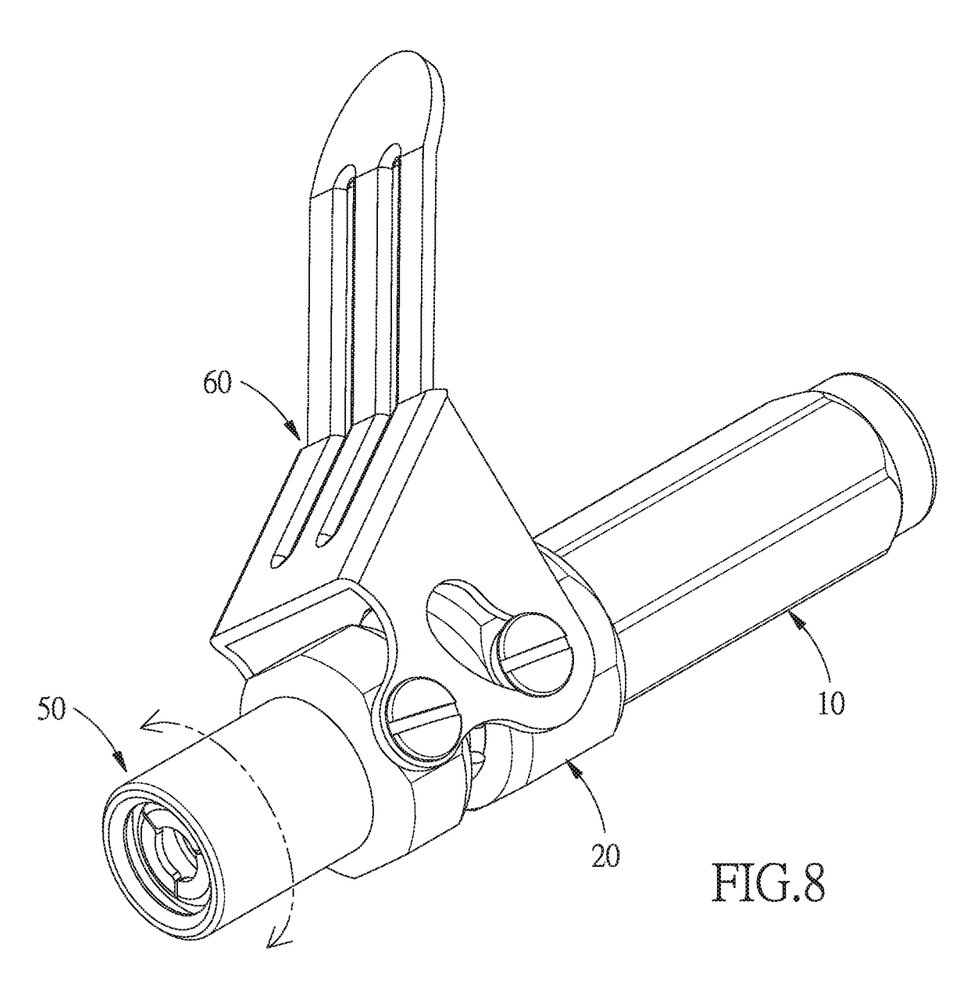
FIG. 8 is a perspective usage status view of one embodiment of the present invention and shows that a pivoting assembly and a sleeve can movably pivot.

As shown in FIG. 8, the pivoting assembly 20 and the sleeve 50 can movably pivot in the radial direction with the pipe 10 as the center and can also drive the handle 60. Compared with a common fixing manner, the users can pivot the quick-disassembly nipple connector structure according to different limited spaces during operation, so that spatial limitations are avoided. The users just need to pivot the quick-disassembly nipple connector structure by required angles, and thus, the functional requirements for multi-angle pivoting and convenient usage are met.

The structure and configuration of all the components of the quick-disassembly nipple connector structure of the present invention are described above.

From the above description, the quick-disassembly nipple connector structure is mainly composed of the pipe 10, the pivoting assembly 20, the screwing member 30, the plurality of gripping jaws 40, the sleeve 50 and the handle 60. The handle 60 can be pulled by the users to enable the quick-disassembly nipple connector structure to be rapidly connected to or separated from the grease nipple A. When the handle 60 is pulled downwards, the sleeve 50 is located at the lock position P1 to lock the grease nipple A; and when the handle 60 is pulled upwards, the sleeve 50 is located at the release position P2 to release the grease nipple A. Thus, the quick-disassembly nipple connector structure has the advantages of being capable of improving work efficiency, high in positioning speed, high in accuracy and good in fixing property and has a good overall constituent strength, so that the motion stability of the nipple connector structure is improved, and the operation smoothness and service life of the nipple connector structure are ensured.

In addition, the pivoting assembly 20 and the sleeve 50 can movably pivot and can also drive the handle 60 so that the users can perform angle adjustment according to requirements so as to adjust the quick-disassembly nipple connector structure to the proper position, thus, improving the service efficiency. In addition, the quick-disassembly nipple connector structure is not limited by narrow spaces, thus, facilitating operation and improving the product competitiveness.

In conclusion, the above embodiments and drawings are only preferred embodiments and drawings of the present invention and are not used for limiting the protection scope of the present invention. Any modifications, equivalent substitutes and improvements based on the spirit and principle of the present invention should fall within the protection scope of the present invention.

What is claimed is:

1. A quick-disassembly nipple connector structure, comprising:
    a pipe, wherein the pipe comprises a pivoting part and a screwing part connected to the pivoting part;
    a pivoting assembly, wherein the pivoting assembly is disposed around the pivoting part in a pivoting manner;
    a screwing member, wherein the screwing member is in screw joint with the screwing part, and a fixing ring groove is concavely formed in an outer surface of the screwing member;
    a plurality of gripping jaws, wherein each said gripping jaw is provided with a first sleeving end to be disposed around the fixing ring groove and a second sleeving end opposite to the first sleeving end;
    a sleeve, wherein the sleeve comprises two opposite holes, is disposed around the screwing member and the plurality of gripping jaws in a pivoting manner, is provided with a convex abutting part having a concave inner circular wall and abutting against the plurality of gripping jaws, and is capable of moving between a lock position and a release position; when located at the lock position, the sleeve is close to the pivoting assembly, and the convex abutting part abuts against the plurality of gripping jaws; and when located at the release position, the sleeve is away from the pivoting assembly, and the convex abutting part does not abut against the plurality of gripping jaws;
    two first locking components; and
    a handle, wherein the handle comprises two opposite first through holes, is disposed to the pivoting assembly, is fastened with the sleeve by inserting the two first locking components into the two first through holes and the two holes of the sleeve, and is driven by the pivoting assembly and the sleeve to pivot synchronously along with the pivoting assembly and the sleeve, so that the sleeve is driven to move to the lock position or the release position.

2. The quick-disassembly nipple connector structure according to claim 1, wherein a connecting part is disposed between the pivoting part and the screwing part and is concavely provided with a limiting ring groove; and the quick-disassembly nipple connector structure further comprises a C-shaped fastener, which is disposed around the limiting ring groove and abuts against the pivoting assembly.

3. The quick-disassembly nipple connector structure according to claim 2, wherein the quick-disassembly nipple connector structure further comprises an O-shaped ring, which is disposed around a portion between the connecting part and the screwing part and is covered by the screwing member.

4. The quick-disassembly nipple connector structure according to claim 1, wherein a concave groove is formed between the pivoting part and the screwing part; the quick-disassembly nipple connector structure further comprises two second locking components and two spacers, and the two second locking components respectively penetrate through the two spacers and the handle and are locked on the sleeve; each said second locking component is provided with a head and a body connected to the head; the head of each said second lock component abuts against the corresponding spacer; and the body of each said second lock component has an end connected to the corresponding head and an end corresponding to the concave groove.

* * * * *